(No Model.)

J. YOCOM, Jr.
SHAFT COUPLING.

No. 333,376. Patented Dec. 29, 1885.

WITNESSES:

INVENTOR
James Yocom Jr

UNITED STATES PATENT OFFICE.

JAMES YOCOM, JR., OF PHILADELPHIA, PENNSYLVANIA.

SHAFT-COUPLING.

SPECIFICATION forming part of Letters Patent No. 333,376, dated December 29, 1885.

Application filed June 30, 1885. Serial No. 170,230. (No model.)

*To all whom it may concern:*

Be it known that I, JAMES YOCOM, Jr., a citizen of the United States, residing in Philadelphia, Pennsylvania, have invented a new and useful Improvement in Shaft-Couplings, of which invention the following is a specification.

This invention relates to the shaft-coupling for which Letters Patent No. 17,236 were granted to W. Sellers and C. Sellers, May 5, 1857. To loosen such couplings, the nuts on the bolts having been unscrewed a wedge has to be driven through a hole made for that purpose in the external sleeve against the conical sleeves, thereby forcing them apart, or by the process known as "backing" or "springing," which consists in driving a wedge into the split $h$ in the conical sleeves.

The object of my invention is to facilitate the operation of loosening these couplings; and it consists in shortening the conical sleeves a little, so as to leave an unoccupied space between their interior ends when they are in place, and providing each of the longitudinal bolts with a projection which partly occupies said space, and adapts the bolts to be used as rams for forcing the conical sleeves apart by direct blows.

Figure 1:
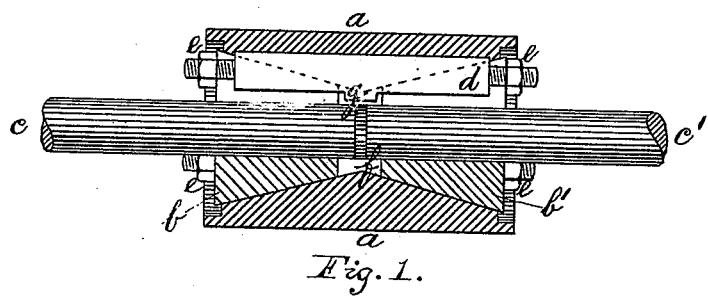
Figure 2:
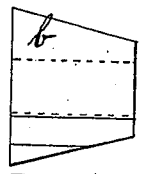
Figure 3:
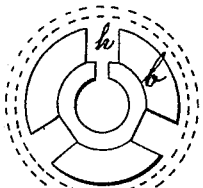
Figure 4:
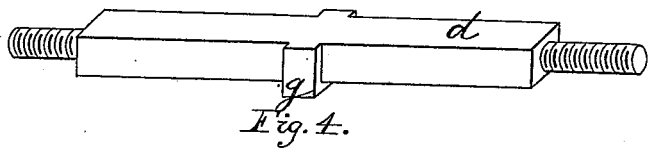

In the annexed drawings, Figure 1 is a sectional elevation of a Sellers' coupling embodying my invention; Fig. 2, a side, and Fig. 3 an end, elevation of either of the two conical sleeves; Fig. 4, a perspective view on an enlarged scale of any one of the longitudinal bolts, provided with the projection at the middle thereof, forming a head which adapts the bolt to be used as a ram for driving out the conical sleeves.

$a$ represents the external sleeve. $b$ and $b'$ represent the two conical sleeves; $c$ and $c'$, the shafts.

$d$ represents any one of the three bolts used with nuts $e$ for holding the sleeves $b$ and $b'$ together.

Between the inner ends of the sleeves $b$ and $b'$ there is a free space, $f$.

Each of the bolts $d$ is provided with a projection, $g$, which rests in the space $f$, leaving room for longitudinal movement of the bolt. The projection $g$ extends over the inner ends of the conical sleeves, as shown in Fig. 1. I prefer to form the projection $g$ by causing it to extend from three sides of the bolt $d$, as shown in Fig. 4; but it answers its purpose if extended from two sides or from one side only.

In order to loosen the coupling on the shafts, the nuts $e$ on the several bolts $d$ having been first removed or sufficiently loosened, blows are struck on the bolts $d$ at either end of the respective bolts, thereby driving the projection $g$, as a ram-head, against the inner end of one or the other of the conical sleeves and forcing these sleeves apart.

I claim—

In combination with the external sleeve, $a$, of a shaft-coupling, the conical sleeves $b$ $b'$ and a screw-bolt, $d$, provided with fastening-nuts and a projection, $g$, substantially as and for the purpose set forth.

JAMES YOCOM, JR.

Witnesses:
J. E. SHAW,
P. A. FENIMORE.